United States Patent
King et al.

(10) Patent No.: US 9,347,175 B2
(45) Date of Patent: May 24, 2016

(54) METHOD OF DISSOLVING LIGNOCELLULOSIC MATERIALS

(75) Inventors: Alistair W. T. King, Espoo (FI); Ilkka Kilpelainen, Espoo (FI)

(73) Assignee: Stora Enso Oyj, Helsinki (FI)

( * ) Notice: Subject to any disclaimer, the term of this patent is extended or adjusted under 35 U.S.C. 154(b) by 0 days.

(21) Appl. No.: 13/806,139

(22) PCT Filed: Jun. 23, 2011

(86) PCT No.: PCT/FI2011/050609
§ 371 (c)(1),
(2), (4) Date: Mar. 7, 2013

(87) PCT Pub. No.: WO2011/161326
PCT Pub. Date: Dec. 29, 2011

(65) Prior Publication Data
US 2013/0153163 A1     Jun. 20, 2013

(30) Foreign Application Priority Data
Jun. 23, 2010  (FI) ...................................... 20105727

(51) Int. Cl.
| | |
|---|---|
| *D21C 3/20* | (2006.01) |
| *C08B 1/00* | (2006.01) |
| *C08H 8/00* | (2010.01) |
| *C08J 3/09* | (2006.01) |
| *C08L 1/02* | (2006.01) |
| *D01F 2/02* | (2006.01) |
| *D01F 13/02* | (2006.01) |

(52) U.S. Cl.
CPC ... *D21C 3/20* (2013.01); *C08B 1/00* (2013.01); *C08B 1/003* (2013.01); *C08H 8/00* (2013.01); *C08J 3/096* (2013.01); *C08L 1/02* (2013.01); *C08J 2401/02* (2013.01); *C08J 2497/02* (2013.01); *D01F 2/02* (2013.01); *D01F 13/02* (2013.01); *Y02P 70/627* (2015.11)

(58) Field of Classification Search
CPC .............. D21C 3/20; C08B 1/00; C08H 8/00; C08J 3/096
USPC ........................................................... 162/72
See application file for complete search history.

(56) References Cited

FOREIGN PATENT DOCUMENTS

| | | |
|---|---|---|
| EP | 2289899 A1 | 3/2011 |
| WO | WO03029329 A2 | 4/2003 |

(Continued)

OTHER PUBLICATIONS

Earle et al, The distillation and volatility of ionic liquids, Nature, Feb. 2006 vol. 439/16.*

(Continued)

*Primary Examiner* — Jacob Thomas Minskey
(74) *Attorney, Agent, or Firm* — Seppo Laine Oy

(57) ABSTRACT

The invention describes solutions containing cellulose and a method of dissolving lignocellulosic materials. In the method, the lignocellulosic material is contacted with a conjugate acid, formed by a strong organic base and a weaker acid, under conditions which are conducive to at least a partial dissolution of the cellulosic components of the lignocellulosic material. It has been found that it is possible to recover at least a portion of the dissolved part of the lignocellulosic material by at least partial dissociation of the conjugate acid. Furthermore it is possible to recover at least a portion of the dissociated organic base and the acid, to form a conjugate acid of the recovered base and acid, and to recycle it for use in the first steps of the method.

13 Claims, 2 Drawing Sheets

(56) References Cited

FOREIGN PATENT DOCUMENTS

| WO | WO2007057235 A2 | 5/2007 |
| WO | WO2008003643 A1 | 1/2008 |
| WO | WO2008043837 A1 | 4/2008 |

OTHER PUBLICATIONS

Alistair W T. King, Janne Asikkala, Ilpo Mutikainen, Paula Järvi, & Ilkka Kilpeläinen (2011): Distillable Acid-Base Conjugate Ionic Liquids for Cellulose Dissolution and Processing, Angew. Chem. Int. Ed 2001, 50, 6301-6305.

An-Guo Yina, Luo Liu, Guo-Feng Wu, Gang Chen, Xin-Zhi Chen & Wei-Dong Ye (2009): Aza-Michael addition of aliphatic or aromatic amines to -unsaturated compounds catalyzed by a DBU-derived ionic liquid under solvent-free conditions, Tetrahedron Letters 50, 1653-1657.

Haibo Xie, Ilkka Kilpelainen, Alistair King, Timo Leskinen, Paula Jarvi & Dimitris S. Argyropoulos (2010): "Opportunities with Wood Dissolved in Ionic Liquids" in Tim F. Liebert, Thomas J. Heinze, Kevin J. Edgar (ed.), Cellulose Solvents: For Analysis, Shaping and Chemical Modification, ACS Symposium Series, vol. 1033, 343-363.

Haixiang Gao, Buxing Han, Junchun Li, Tao Jiang, Zhimin Liu, Weize Wu, Yanhong Chang & Jianmin Zhang (2004): Preparation of Room-Temperature Ionic Liquids by Neutralization of 1,1,3,3-Tetramethylguanidine with Acids and their Use as Media for Mannich Reaction, Synthetic Communications, 34:17, 3083-3089.

Hugh G. Lawford & Joyce D. Rousseau (2003): Cellulosic Fuel Ethanol, Alternative Fermentation Process Designs with Wild-Type and Recombinant Zymomonas mobilis, Applied Biochemistry and Biotechnology, vol. 105-108, 457-469.

Nuno M. M. Mateus, Luis C. Branco, Nuno M. T. Lourenco & Carlos A. M. Afonso (2003): Synthesis and properties of tetra-alkyl-dimethylguanidinium salts as a potential new generation of ionic liquids, Green Chemistry, 5, 347-352.

Shenghai Li, Yingjie Lin, Haibo Xie, Suobo Zhang & Jianing Xu (2005): Bronsted Guanidine Acid-Base Ionic Liquids: Novel Reaction Media for the Palladium-Catalyzed Heck Reaction, Organic Letters, vol. 8 No. 3, 391-394.

Tao Jiang, Haixiang Gao, Buxing Han, Guoying Zhao, Yanhong Chang, Weize Wu, Liang Gao & Guanying Yang (2004): Ionic liquid catalyzed Henry reactions, Tetrahedron Letters 45, 2699-2701.

\* cited by examiner

Gas-phase proton affinities at MP2/6-311+G(d,p) level of theory

METHOD OF DISSOLVING LIGNOCELLULOSIC MATERIALS

SUMMARY OF THE INVENTION

The present invention relates to dissolution of lignocellulosic materials. In particular the invention concerns solutions and dispersions of lignocellulosic materials.

The invention also concerns a method of dissolving a lignocellulosic material in an ionic liquid and a method for depolymerisation of lignocellulosic material.

Lignocellulosic materials and in particular the cellulosic components thereof, are scarcely soluble in traditional solvents, such as apolar and polar organic compounds. However, it has recently been shown that lignocelluloses can be successfully dissolved in ionic liquids, cf. Haibo Xie, Ilkka Kilpeläinen, Alistair King, Timo Leskinen, Paula Järvi, and Dimitris S. Argyropoulos, "Opportunities with Wood Dissolved in Ionic Liquids" in Tim F. Liebert, Thomas J. Heinze, Kevin J. Edgar (ed.) *Cellulose Solvents: For Analysis, Shaping and Chemical Modification* ACS Symposium Series, Volume 1033 (2010), p. 343-363.

Examples of ionic compounds are imidazolium-based ionic liquids, such as [bmim]Cl, (1-butyl-3-methylimidazolium chloride), [emim][OAc] (1-ethyl-3-methylimidazolium acetate) and [emim][Me$_2$PO$_4$] (1-ethyl-3-methylimidazolium dimethylphosphate).

The success of the afore-mentioned imidazolium-based ionic liquids at dissolving certain major lignocellulosic components is partly attributable to the weak hydrogen-bond (H-bond) acidities and strong H-bond basicities of the relevant cation and anion combinations. A significant increase in H-bond acidity or decrease in H-bond basicity is suggested to eliminate the capability of these compounds in dissolving lignocellulosic materials.

Interest in these ionic liquids is not only attributable to their ability to dissolve or to swell or to extract (or a combination of two or more of these activities) certain lignocellulosic components but also to the fact that they have little or no vapour pressure, in comparison to non-ionic molecular solvents. This suggests that environmentally benign processes can be developed from them due to vastly reduced volatile organic compound (VOC) emissions and reaction hazards (risk of explosion, fire or corrosion).

However, it has been found that the inertness (chemical stability) and low volatility of these compounds makes the design of fully recyclable and sustainable processes difficult. Many of the present prospective processes, using ionic liquids for the processing of lignocellulosics, rely on precipitation of solubilized material for product preparation and recycling of ionic liquid. This can be problematic because often not all of the product is precipitated from the reaction media, reducing process yields and preventing the recycling of costly ionic liquids.

It is an aim of the present invention to eliminate at least some of the problems related to the known art and to provide a new way of processing (incl. dissolving, extracting or chemically modifying) lignocellulosic raw-materials.

It is another aim to provide novel solutions of lignocellulosic materials, in particular cellulose, and of methods capable of industrial application for processing, including at least partially dissolving, lignocellulosic materials and for recirculation (or recycling) of the spent dissolving media.

The present invention is based on the concept of processing lignocellulosic materials in a new class of ionic liquids which will provide for increased efficiency of recycling over present ionic liquids for lignocellulose processing.

Physical and chemical treatments of cellulose dissolved in similar protic ionic liquids is suggested in WO 2007/057235 which includes a laundry list of various components of the conjugate acids. However, there is no specific teaching in WO 2007/057235 of the specific acids used herein, nor is there any suggestion of a method of recycling of the ionic liquid as described in the following.

The new class of ionic liquids are conjugate acids, which are comprised of strong organic bases, in particular 1,1,3,3-tetramethylguanidine (TMG), 1,1,2,3,3-pentamethylguanidine (PMG), 1,8-diazabicyclo[5.4.0]undec-7-ene (DBU), 1,2-dimethyl-1,4,5,6-tetrahydropyrimidine (DTP) or iminotris(dimethylamino)phosphorane (ITDP) with inorganic or organic conjugate acids, such as propionic acid (and other carboxylic acids), hydrochloric acid, methyldihydrogenphosphonate, dimethylhydrogenphosphate or phosphinic acid.

Thus, novel solutions or dispersions of lignocellulosic materials are obtained wherein the lignocellulosic material is at least partially dissolved in a conjugate acid of the above kind.

The conjugate acid can be employed in a method of processing lignocellulosic materials in which the lignocellulosic material is contacted with a conjugate acid, formed by a strong organic base and a weaker acid, under conditions, which are conducive to at least a partial dissolution of the cellulosic components of the lignocellulosic material.

Surprisingly it has been found that it is possible to recover at least a part of the dissolved part of the lignocellulosic material by at least partial dissociation of the conjugate acid. Furthermore it is possible to recover at least a portion of the dissociated organic base and the acid, to form a conjugate acid of the recovered base and acid, and to recycle it for use in the first steps of the method.

The method can be adapted for depolymerisation of lignocelluloses to yield depolymerisation products including mono- and oligosaccharides which are useful in the production of biofuels (such as ethanol) and chemicals, including commodity chemicals.

The present invention also provides the use of the method for the production of biofuels.

Considerable advantages are obtained by the novel ionic liquids. The novel ionic liquids are efficient media for the dissolution and processing of lignocellulosic materials, such as wood, pulp and other lignocelluloses and cellulose raw-materials, which contain cellulose and lignin optionally in combination with other typical components of wood materials and components derived therefrom, such as hemicelluloses and extractives. The novel liquids are capable of dissolving cellulose and solvate intact wood.

The present technology can be used for chemical modification of the material.

Further, whereas conventional ionic liquids can distil, which may involve dissociation into highly reactive species and reformation during heating, evaporation and condensation, it has surprisingly been found that distillation of the present acid/base conjugates allows for simple recycling of the medium used for processing, without degradation in the yield and quality of the recycled ionic liquid, in comparison to traditional ionic liquids. Any solute contained in the liquid or dissolved phase can therefore readily be recovered by distilling off of the ionic liquid components, which combine to reconstitute the ionic liquid in higher yield and purity. Thus, in one embodiment of the invention there is no need for the use of precipitants and other external components.

The significant advantage of distillation of the present ionic liquids over the traditional structures is in the purity of the recovered product. Due to the significant energy required in the dissociation of the traditional imidazolium-based ionic liquid structures, and the reactivity of the intermediates (which may be one or more of unconjugated acid, carbenes, alkyl electrophiles, alkylimidazole bases and additional decomposition products), stability and purity of solutes and recycled products almost invariably suffers. The energies and reactivities involved in distillation of the ionic liquids described in the present invention are much lower, allowing for higher stabilities and purities of solutes and recycled materials.

DETAILED DESCRIPTION

Figure 1:
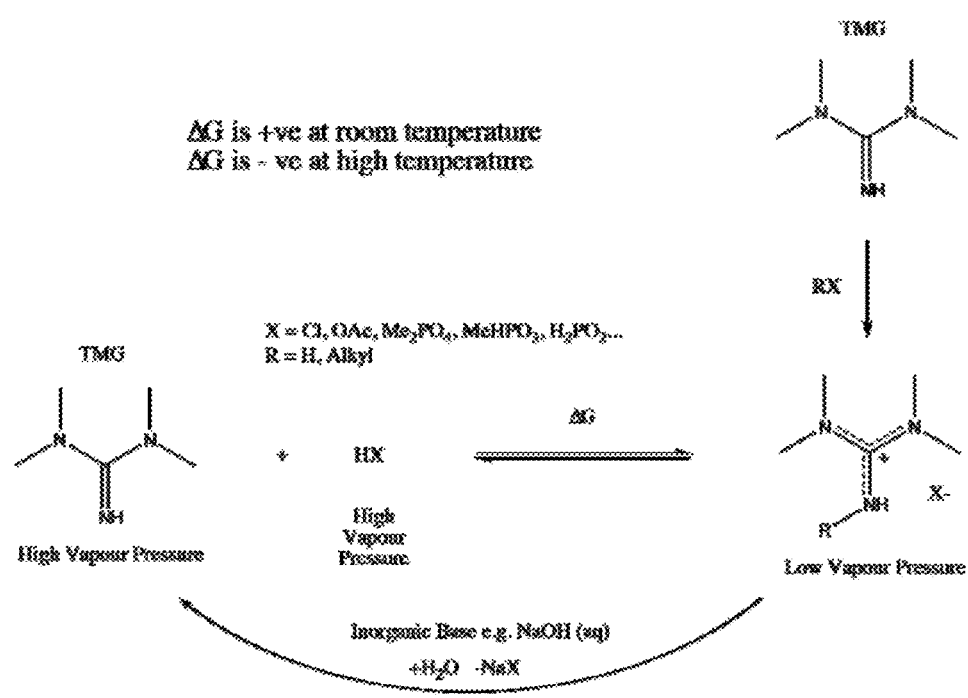
FIG. 1 shows in schematic form the inherent recyclability of TMG-based acid/base conjugate ionic liquids.
Figure 2:
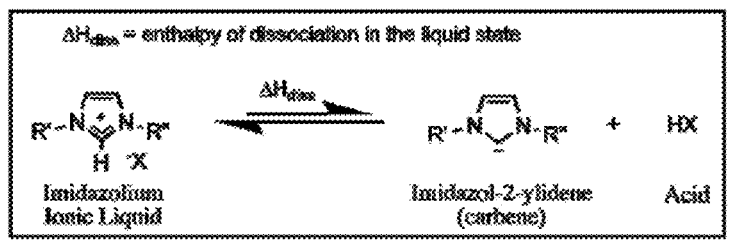
FIG. 2 shows the relative gas-phase proton affinities ($\Delta H_{PA}$) fpr strong organic bases calculated at the MP2 6-311+G(d,p) level.
Figure 2:
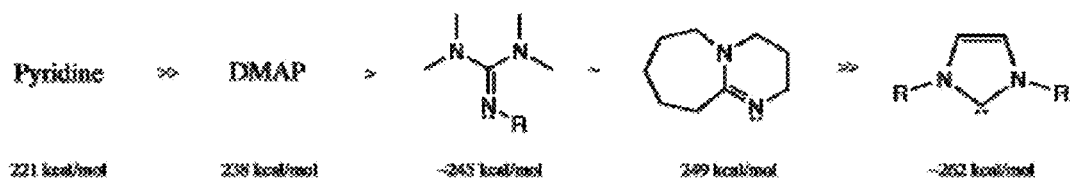
Figure 3:
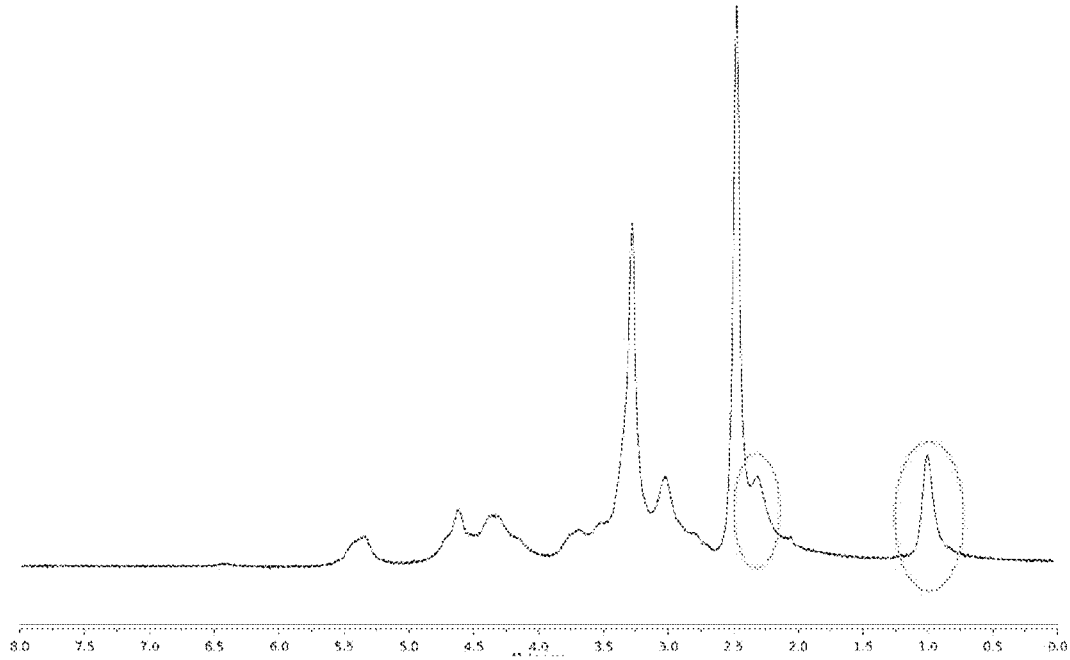
FIG. 3 shows the a $^1$H-NMR spectrum for a dried powder soluble in d6-DMSO (cellulose sample of Example 5).

Next the invention will be examined more closely with the aid of a detailed description with reference to the attached drawings, in which FIG. 1 shows in schematic form the inherent recyclability of TMG-based acid/base conjugate ionic liquids; FIG. 2 shows the relative gas-phase proton affinities ($\Delta H_{PA}$) for strong organic bases calculated at the MP2 6-311+G(d,p) level. Only some of these bases, when combined with an acid are capable of dissolving cellulose. The ability to dissolve cellulose is in part dependant on the basicity of the unconjugated base as combinations of acids and bases with $\Delta H_{PA}$s similar to DMAP and lower do not dissolve cellulose outright. Examples of bases, when combined with for example propionic acid, that dissolve cellulose are as follows: TMG, DBU, PMG, DTP and IDTP; and
FIG. 3 shows the a $^1$H-NMR spectrum for a dried powder soluble in d6-DMSO (cellulose sample of Example 5).

In general, the effectiveness of the ionic liquid at dissolving cellulose will depend both on the basicities of the unconjugated acids and bases. For the purposes of this description the general term basicity can be taken to mean H-bond basicity or Brønsted basicity. Typically the conjugated acid/base ionic liquid must contain anions with significant H-bond basicity to break H-bonds between lignocellulosic biopolymers, to aid in solvation of those species. This suggests the combination of an acid, with a relatively low acidity, with an organic base. Conversely, the unconjugated base should have relatively high basicity as not to allow for deprotonation to a significant degree by the anion or to allow for quenching of the electron density on the anion by a close contact or NH—X H-bond. The scope of structures allowed by the patent can best be limited by describing the various combinations of unconjugated acids and bases based upon their gas-phase proton affinities ($\Delta H_{PA}$).

$\Delta H_{PA}$ values are a measure of the gas-phase basicity of the individual anions or neutral bases. It is the energy released in the following reactions:

X$^-$+H$^+$→[XH] or X:+H$^+$→[XH]$^+$

They can be calculated using standard ab initio computational chemistry software packages or extracted from the literature. $\Delta H_{PA}$ values for common acids and organic bases, found in ionic liquid structures, calculated at the MP2 6-311+G(d,p) level are presented in Table 1.

TABLE 1

| Name/Trivial Name | Species | $\Delta H_{PA}$ (kcal/mol) |
| --- | --- | --- |
| hydroxide | [OH]$^-$ | −391.28 |
| methylacetamide | [MeNAc]$^-$ | −361.58 |
| acetate | [OAc]$^-$ | −347.96 |
| methylcarbonate | [MeCO$_3$]$^-$ | −338.89 |
| chloride | Cl$^-$ | −336.06 |
| phosphinate | [H$_2$PO$_2$]$^-$ | −333.74 |
| dimethylphosphate | [Me$_2$PO$_4$]$^-$ | −330.66 |
| methylhydrogenphosphonate | [MeHPO$_3$]$^-$ | −329.70 |
| trifluoroacetate | [CF$_3$CO$_2$]$^-$ | −322.95 |
| mesylate | [MeSO$_3$]$^-$ | −321.18 |
| ethylsulfate | [EtSO$_4$]$^-$ | −313.56 |
| methylsulfate | [MeSO$_4$]$^-$ | −313.22 |
| triflate | [OTf]$^-$ | −302.23 |
| bis(trifluoromethylsulfonyl)imide | [NTf$_2$]$^-$ | −297.84 |
| 1-allyl-3-methylimidazol-2-ylidene | [amim]: (carbene) | −264.03 |
| 1-butyl-3-methylimidazol-2-ylidene | [bmim]: (carbene) | −264.01 |
| 1-ethyl-3-methylimidazol-2-ylidene | [emim]: (carbene) | −262.90 |
| 1-methyl-3-methylimidazol-2-ylidene | [mmim]: (carbene) | −261.72 |
| 1-ethylthiazol-2-ylidene | [etz]: (carbene) | −254.16 |
| imino-tris(dimethylamino)phosphorane | ITDP | −253.90 |
| 1,1,2,3,3-pentamethylguanidine | PMG | −249.32 |
| 1,8-diazabicyclo[5.4.0]undec-7-ene | DBU | −248.88 |
| 1,2-dimethyl-1,4,5,6-tetrahydropyrimidine | DTP | −246.14 |
| 1,1,3,3-tetramethylguanidine | TMG | −244.88 |
| 4-(dimethylamino)pyridine | DMAP | −238.10 |
| 1-methylimidazole | MIM | −228.80 |
| diethylamine | DEA | −227.58 |
| pyridine | Pyr | −220.68 |

For use of conjugated acid/base mixtures in the present application, the unconjugated organic base should have $\Delta H_{PA}$ values lower than that of DMAP (lesser than ca. −240 kcal/mol) but higher than that of the dialkylimidazol-2-ylidenes (greater than ca. −260 kcal/mol). Thus, according to one embodiment, the unconjugated base can be selected from the group of amidines, guanidines and phosphazenes.

For use of conjugated acid/base mixtures in the present application, the anions of the unconjugated acids should have $\Delta H_{PA}$ values the same as and lower than that of bis(trifluoromethylsulfonyl)imide (lesser than ca. −300 kcal/mol), with the more effective anions of the unconjugated acids having $\Delta H_{PA}$ values of −320 kcal/mol and lesser. The most effective anions of the unconjugated acids have $\Delta H_{PA}$ values of −325 kcal/mol and lesser. Typically, in one embodiment, the minimum $\Delta H_{PA}$ values of the acids are generally on the order of −400 kcal/mol or greater, for example −350 kcal/mol or greater.

Naturally the same level of ab initio theory should be used for measuring the effectiveness of all acid/base combinations.

For the purpose of the present technology, the term "lignocellulosic materials" has a broad meaning and is intended to cover a large variety of materials which contain lignocellulosic components (i.e. components formed from differing proportions of lignin, hemicelluloses and cellulose or potentially only one component as such).

As already indicated above, raw-materials comprising or derived from, for example, wood are possible. The wood can be in form of particles (e.g. sawdust), fibres, granules and chips, shavings etc. having a large range of sizes in the range of typically 0.1 to 50 mm (smallest dimension of the particles or part) although these are no absolute limits.

Various sources of wood are covered, including deciduous and coniferous species, such as spruce, pine, birch, poplar, aspen, and eucalyptus. However, non-wood materials are also included in the term "lignocellulosic materials" as used in the present context. Such raw-materials can be derived from plants, such as annular or perennial plants, including straw, willow, energy hay, *Miscanthous*. Microbial sources can also be included, such as *A. xylinusi*.

Another interesting raw-material covered by the above definition is peat which is rich in various carbohydrates, including polysaccharides and other glycans. Further, raw-material sources containing cellulose in pure or relatively pure form are also possible. A typical example is cotton, either in native form or after chemical or mechanical treatment, e.g. mercerized.

All of the above materials can be used as such or mechanically or chemically processed (i.e. as "lignocelluloses-derived products"). Examples of lignocellulose-derived products include chemical, mechanical and chemomechanical pulps produced of any of the above raw-materials on an industrial or laboratory scale.

Cellulosic pulps, such as chemical pulps produced by conventional pulping are particularly interesting raw-materials.

Another interesting raw-material is formed by lignocellulose fractions obtained by degrading treatments of wood or annular or perennial plants, for example by steam explosion, hydrolytic degradation by water, acid, enzymes or metal catalysts or mixtures thereof, potentially at increased temperatures and in the presence of oxygen or oxygen-containing gases.

Naturally it is possible to employ any of the above-mentioned sources of lignocellulosic materials as such or as a combination or mixture of two or more materials of the indicated kind.

The present invention provides for new ionic liquid media for processing of lignocellulosic materials. "Processing" stands generally for any step of contacting the material with the liquid medium wherein at least a part, typically at least 1% by weight, in particular 10 to 100% by weight of the material is dissolved or solvatated in the liquid medium. The undissolved or unsolvatated portion of the material is typically present as solid matter in the medium. Thus, by processing, a modified material is obtained at least of part of which is dissolved or solvatated (leached out of the material) and optionally a part of which is present in suspended form in the liquid medium.

The consistency of the lignocellulosic material in the ionic liquid is about 0.1 to 40% by weight, calculated from the total weight of the dispersion. Typically, the consistency is about 1 to 25% by weight, or even 1 to 20% by weight, as disclosed below.

Thus, the terms "processing of lignocelluloses" or "lignocellulose processing" as used herein include, but are not limited to, methods for dissolution, constructive regeneration, chemical modification and fractionation of the materials of interest. "Solvatation" of wood and other lignocellulosic materials and of the components present therein is also incorporated in the term. The term "solvation" includes achieving various swollen states of the material, such as conventional solvatation, partial dissolution and reactive dissolution.

The dissolved or solvatated portion of the material typically consists of cellulose, optionally in combination with other glycans or hemicelluloses. The present ionic liquids are particularly efficient in dissolving and solvatating cellulose. Under certain conditions, the ionic liquids may also selectively dissolve lignin rich material. This may also be in combination with cellulose or other hemicelluloses.

When used below in connection with the solvatating liquid systems, the term "thermal treatment" covers not only traditional heating, by also other processing steps that may increase the temperature of the ILs or solvatated systems e.g. ultrasound treatment and microwave treatment.

The "conjugate acids" used in the processing are comprised of combinations of strong organic bases with weaker acids which together form a conjugate; a conjugate acid. Typically, the acid-base pair forms an ionic liquid, a salt in molten form at ambient or moderate temperature and pressure. Present in the liquid is therefore an anion derived from the acid and a cation derived primarily from the organic base. Salts which are crystalline or solid at ambient temperatures and pressures may also be termed ionic liquids. Under the current definition of ionic liquids, conjugate acids which are liquid at process conditions, but solid under milder conditions, can be termed ionic liquids.

The strength of the component organic base and acids are such that they will provide ionic liquids with H-bond acidities and basicities to allow for processing of lignocellulosic materials, as explained above.

The strong organic base is derived from substituted amidines, guanidines, phosphazenes, guanidinophosphazenes, proton sponges, organosuperbases, such as Verkades base, and related structures, cf. Davor Margetic, Ch 2. Physio-Chemical Properties of Organosuperbases; Superbases for Organic Synthesis: Guanidines, Amidines, Phosphazenes and Related Organocatalysts. Ed. Tsutomu Ishikawa, Pub. John Wiley & Sons, 2009. The strong organic base is preferably derived from a substituted amidine or guanidine. Typically, in the present context, the amidine base has the formula I and guanidine base has the formula II.

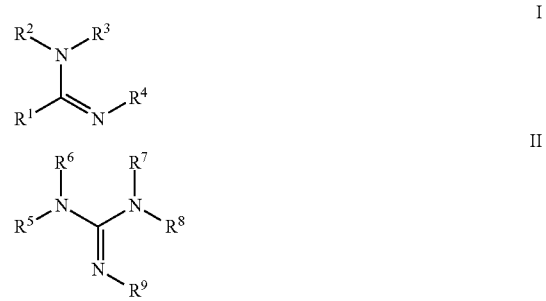

In Formula I, $R^1$, $R^2$, $R^3$ and $R^4$ are the same or different and are selected from hydrogen, unsubstituted or substituted lower alkyl groups, aliphatic groups, heterocyclic groups and aromatic groups having 5 to 18 ring atoms, at least one of $R^1$, $R^2$, $R^3$ and $R^4$ representing an alkyl group having 1 to 6 carbon atoms, which is unsubstituted or optionally substituted.

In Formula II, $R^5$, $R^6$, $R^7$, $R^8$ and $R^9$ are the same or different and are selected from hydrogen, unsubstituted or substituted lower alkyl groups, aliphatic groups, heterocyclic groups and aromatic groups having 5 to 18 ring atoms, at least one of $R^5$, $R^6$, $R^7$, $R^8$ and $R^9$ representing an alkyl group having 1 to 6 carbon atoms, which is unsubstituted or optionally substituted.

Any of $R^1$, $R^2$, $R^3$, $R^4$, $R^5$, $R^6$, $R^7$, $R^8$ and $R^9$ can additionally contain functionalities such as unsaturated double bonds, such as the allyl group, alicyclic, heterocyclic or aromatic rings, such as the benzyl group, or contain additional terminal functionalities such as alcohols, amines, carboxylic acids/carboxylates. In this respect, a zwitterionic ionic liquid structure is possible.

Two or more of $R^1$, $R^2$, $R^3$, $R^4$, $R^5$, $R^6$, $R^7$, $R^8$ and $R^9$, together with one or more adjacent nitrogen atoms of the amidine or guanidine structure, can form one or several heterocyclic ring structures each typically comprising one to three rings. Such rings of the heterocyclic ring structure have for example 3 to 18 ring atoms, typically 4 to 9, in particular 5 to 8 ring atoms and the heterocyclic ring structure is fused on the amidine or guanidine backbone. An example of this is 1,8-diazabicyclo[5.4.0]undec-7-ene (DBU) whereby two rings are fused onto the amidine backbone.

As mentioned above, structures I and II may also contain cyclic structures, attached to the same nitrogen and not fused to the amidine or guanidine backbone. It should be pointed out that, in one embodiment, cyclic structures offer hydrolytic or alcoholytic stability, or a combination thereof, to the bases.

Particularly interesting guanidine derivatives are formed by tetraalkyl or pentaalkyl guanidine derivatives, wherein the alkyl groups are methyl, ethyl or n- or i-propyl. 1,1,3,3-tetramethylguanidine (in the following abbreviated "TMG") and 1,1,2,3,3-pentamethylguanidine (in the following abbreviated "PMG") are particularly preferred.

The acid portion of the conjugated acid is derived from a Brønsted acid having the general formula III $$HX \qquad \qquad III$$

wherein X stands for an anion selected from the group of halogen, sulphate, nitrate, nitrite, phosphate, phosphinate, carboxylate, sulphonate, organosulphates, organosulfonates, organophosphates, organophosphonates or combinations thereof.

Hydrochloric acid, various carboxylic, optionally substituted acids including formic, acetic, propionic and butyric acid, and derivatives thereof are examples of preferred embodiments. Further examples of preferred embodiments include dimethylhydrogenphosphate, methyldihydrogenphosphonate, phosphinic acid or combinations thereof

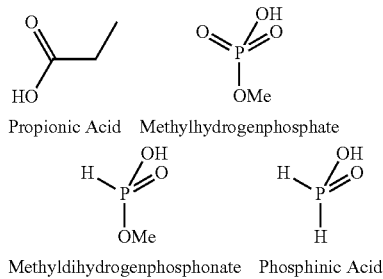

Propionic Acid   Methylhydrogenphosphate

Methyldihydrogenphosphonate   Phosphinic Acid

The present conjugate acids are preferably liquid at ambient conditions (room temperature of 20 to 25° C. and normal pressure) to 100° C. However, the properties of the present ionic liquids, such as melting point and vapour pressure, can be modified by varying their temperature, since the degree of dissociation of the conjugate acid/base liquid will change, as will be discussed below.

The strength of the component organic base and acids are chosen as to afford ionic liquids with suitable H-bond acidities and basicities to allow for processing of certain lignocellulosic components and to afford structures that will at least partially dissociate at acceptable temperatures (<200° C.).

This dissociation will be dependant on the basicity of the anion of the unconjugated acid, in comparison to the basicity of the unconjugated base. Approximate limits for this difference in basicity can be described in terms of change in gas-phase proton affinity ($\Delta\Delta H_{PA}$) between the anion of the unconjugated acid ($\Delta H_{PA(anion)}$) and the unconjugated base ($\Delta H_{PA(base)}$) where:

$$\Delta\Delta H_{PA} = \Delta H_{PA(base)} - \Delta H_{PA(anion)}$$

In the range of suitable unconjugated bases and acids described above, $\Delta\Delta H_{PA}$ is ca. 95 kcal/mol, plus or minus ca. 65 kcal/mol. Most preferably $\Delta\Delta H_{PA}$ is ca. 95 kcal/mol, plus or minus ca. 25 kcal/mol.

The novel ionic liquids can be synthesized by simple combination of base with acid or quaternization of base with an alkylating reagent.

The present ionic liquids (in the following also abbreviated "IL") consist of conjugate organic base/acid ILs, such as those formed from the conjugation of acids with TMG and DBU, to produce high purity products. In the below working example, a recovery of >99% and purity of >99%, as determined by $^1$H NMR has been attained after distillation. As a result, the ILs can be efficiently recycled, in comparison to traditional ionic liquids, maintaining sustainability, purity of reaction components and selectivity of reaction. By contrast, conventional ILs and species formed from their decomposition under certain processing conditions, react (chemical bond) to cellulose, which reduces their capability of being recycled.

Thus, in one embodiment, dissociation the acid/base conjugates allows for simple recycling of the media and any solute contained within as shown in FIG. 1.

Dissociation may be achieved thermolytically, i.e. by increasing temperature, for example during distillation, or by simple aqueous acid/base chemistry.

According to one embodiment, the ionic liquid is heated to a temperature of about 50 to 300° C., in particular about 75 to 250° C., preferably to a temperature in excess of its boiling point at the prevailing pressure. It can therefore be recovered from the solution or treatment suspension/dispersion by distillation.

In one interesting embodiment, there is a considerable difference (e.g. at least 10° C., preferably at least 20° C., in particular about 40 to 160° C.) in boiling points between the species of the conjugate acid which makes it possible to separate these components more efficiently during the distillation from the pure ionic liquid (or a reaction mixture) to give the individual acid and base components for further purification or recombination to form IL again.

The enthalpy of dissociation and vaporization of the acid/base conjugates is lower than even the enthalpy of dissociation of imidazolium-based conjugates offering huge energy savings on recycling and increased purity of unconjugated species, due to milder recycling conditions and increased chemical stabilities. An illustrative comparison of the relative proton affinities for strong organic bases, in comparison to the imidazol-2-ylidine base, is shown in FIG. 2.

However, distillation is not limited to recycling based upon dissociation and separation of the conjugates to their separate component species, it can be used to recover the present ILs, without physical separation of unconjugated acids and bases, by distillation of the ILs to one recovery vessel.

As explained above, in an embodiment of the invention, evaporation/condensation, including optionally dissociation of the ionic liquid, will allow for recovery of the dissolved portion without the need of resorting to precipitants. When the concentration of the IL will be reduced, the dissolved matter will precipitate.

However, it is also possible to precipitate the dissolved matter by adding a precipitant such as water, other organic solvents or aqueous and organic solutions to the IL. Any remaining materials dissolved in the mixture may be recovered by sequential distillation and recycling of the precipitant and ionic liquid components.

By using treatment and combined recovery procedures, process bottlenecks such as i) poor recyclability, ii) incomplete precipitation of low molecular weight materials and iii) maintenance of stability of solutes and solvent upon distillation, may be avoided. Distillation of the ionic liquid allows for increased recyclability, in comparison to traditional ionic liquids. Precipitation followed by distillation of precipitant and ionic liquid components from remaining solutes may avoid difficulties in distillation from high viscosity solutions containing high molecular weight components. Addition of a precipitant may aid in the dissociation of the acid base ionic liquid conjugate, allowing for distillation at lower temperatures, higher pressures or may prevent (or reverse) possible reactions with dissolved solutes.

Irrespective of the way in which the dissolved material is recovered from the solution, it is preferred to recycle the IL. According to one embodiment, at least 10% by weight, in particular at least 20% by weight of the ionic liquid is recovered.

According to a particularly preferred embodiment, at least 90% by weight, in particular at least 95% by weight, suitably at least 98% by weight or even at least 99% by weight, of the ionic liquid is recycled as described herein.

Thus, in a preferred embodiment, the ionic liquid is be circulated and used in the method of processing lignocellulosic material. Thus, in one embodiment, at least 1% by weight, preferably 5 to 100% by weight, or—in cases where there is some fresh feed—in particular about 10 to 95% by weight of the ionic liquid used in the processing is formed by recycled conjugate acid obtained by recovery of ionic liquid from a previous step of treating a lignocellulosic material.

The present technology provides generally for a method comprising one or more of the following embodiments. A particular IL, [TMGH][$CO_2$Et], which is a preferred IL, is specifically described in some of the embodiments. However, this should not be interpreted as limiting the application of those embodiments to that IL only.

In a first embodiment, a lignocellulose sample is added to the ionic liquid to form between 1 and 20% consistency by weight. The sample is then thermally treated and agitated at a temperature of about 80-150° C. for a period of time until the material has been sufficiently dispersed or homogenized.

In a second embodiment, using [TMGH][$CO_2$Et] as a specific example, a lignocellulose sample is dispersed into TMG. Propionic acid is added to the mixture, which is agitated until homogenized. The energy released in the addition of acid to base can allow for faster homogenization of the mixture. The mixture is then further agitated and thermally treated until sufficiently dispersed or homogenized. Optionally, the order of addition may be changed with the lignocellulose sample added to propionic acid, followed by TMG. The lignocellulose sample may also be thermally treated for a period with either the acid or base to further facilitate the process of solvation/dissolution or chemical degradation.

Further inclusions of catalyst (e.g. inorganic acid, organic acid or mixed valence metals) may aid both dissolution and degradation.

In the above embodiments, recovery of the IL can be carried out by various procedures. In one embodiment, the solute (processed or unprocessed) and ionic liquid are recovered by distillation of the ionic liquid from the mixture at elevated temperature and/or reduced pressure.

In another embodiment, the solute (processed or unprocessed) and ionic liquid are recovered by addition of an additional solvent, which precipitates the solute. This is then removed from the mixture for further use. The filtrate can then be distilled to recover the additional solvent, ionic liquid, any possible additional reagents or remaining solutes.

The new technology provides new ionic liquid media for lignocellulose processing, with greatly improved recyclabilities over old ionic liquid-based media. This allows for the development of sustainable processes resulting in major reductions in cost and environmental impact, in comparison to old processes.

Production of processed lignocellulose or polysaccharide products, such as fibres or films is possible; in particular the solvated mixtures can be used in spinning (similar to the Viscose process, Lyocell process or wetspinning).

Thus, according to an embodiment, a spinning process of the kind disclosed for the lyocell, viscose, wet-spinning and airgap spinning processes is applied for the present solutions. As regards specific details on physical processing of cellulose solutions in ionic liquids, a detailed description can be found in, e.g., WO 03/029329 A2, the contents of which are herewith incorporated by reference.

Generally, a solvated lignocellulose mixture (obtained for example according to the above steps) may be passed through holes of varying diameters at temperatures that render the mixture liquid (between 10-200° C.) into non-solvents (or mixtures of solutes containing non-solvents) that the ionic liquid will disperse into. The resulting fibres are then collected and washed during the process to remove the ionic liquid. Removal of the ionic liquid may also be aided by heating or under reduced pressure. The non-solvent, ionic liquid components and any additional solvents may be recovered by distillation.

In another embodiment, chemical modification of lignocellulosic materials is sought. One particularly interesting application of the novel ionic liquids is for the treatment of wood/pulp ultimately for the production of biofuels (for example ethanol). In this embodiment, the present ionic liquids provide considerable technical benefits: By varying the temperature of the mixture, the degree of dissociation of the conjugated acid/base IL will change producing both acid and basic species in solution, allowing for (for example) increased rate and selectivity in the depolymerization of biopolymers to their constituent monomers. This may be enhanced by addition of reagents such as alcohols, water, other solvents or other co-catalysts.

Based on the above, the novel ILs can be used in Lignocellulose Depolymerization (for bioethanol, pyrolysis oils and other commodities) for example as follows:

The solvated lignocellulose sample (according to above steps) can be thermally treated to depolymerize (chemically degrade) the lignocellulose biopolymers (e.g. cellulose) to such a state that they are more readily available for enzymatic digestion or further chemical modification after recovery. This may be aided by the addition of a catalyst (e.g. organic or inorganic acid, mixed valence metals) and/or co-reagent.

In a particular embodiment, a solvated lignocellulose mixture (obtained for example according to the above steps) is agitated at temperature ranges specific for the reactivity of the additional chemical reagents. To this solution the reagents are added at a specific rate and the mixture is agitated until reaction is deemed complete.

According to one embodiment, the method of depolymerizing lignocellulosic materials according to the present invention comprises contacting the lignocellulosic material with an ionic liquid formed by a conjugate acid derived from a strong organic amidine or guanidine base and a weaker acid at a temperature of 130° C. or less to achieve at least a partial dissolution of the cellulosic components of the lignocellulosic material, subjecting the solution thus obtained to a temperature in excess of 130° C. for at least partially depolymerizing the dissolved components, recovering at least a part of the dissolved and depolymerized part of the lignocellulosic material by at least partial dissociation of the conjugate acid, recovering at least a portion of the dissociated organic base and the acid, forming a conjugate acid of the recovered base and acid, and contacting the conjugate acid thus formed with lignocellulosic material in a method of processing lignocellulosic material.

Preferably, the lignocellulosic material is dissolved in the ionic liquid at a temperature below 125° C., in particular below 120° C., and it is depolymerized at a temperature in excess of 135° C., preferably in excess of 140° C. and up to about 220° C.

The consistency of the lignocellulosic material in the ionic liquid it about 1 to 40% by weight, calculated from the total weight of the dispersion. Typically, the consistency is about 5 to 25% by weight.

By the above steps, at least 10% by weight, preferably at least 20% by weight, in particular at least 30% by weight, suitably at least 50% by weight of the lignocellulosic material is depolymerized. The depolymerized material is recovered and further processed to give mono- and oligosaccharides.

The product and ionic liquid are then recovered by one of the steps detailed above. For example, the ionic liquid can be distilled under reduced pressure from the reaction mixture leaving the partially or completely depolymerized lignocelluloses remaining.

In the case of bioethanol production, this distillation residue can be subjected to enzymatic digestion (whole-cell, enzyme preparates or purified enzymes). Optionally the material may also be further mechanically or solvent fractionated before digestion to afford increase in yields/selectivities. After digestion, mechanical or solvent fractionation, the non-polysaccharide fractions may be used as chemical feedstocks for other processes.

By removing the ionic liquid by distillation the risk of the ionic liquid poisoning the enzyme preparates or organism is greatly reduced or even eliminated.

In the case of production of commodity chemicals or fuels from lignocellulose the distillation residue can be further distilled at higher temperatures to remove higher boiling chemicals (such as furans, phenols, LGO, LGA, small organics etc.) in an enriched state or as mixtures of compounds for use as commodity preparations or bio-based fuels. Further degradation may be achieved during the distillation, which could be aided by the use of a heterogeneous or homogeneous catalyst (e.g. excess organic or inorganic acid, mixed valence metals, zeolites) and/or a gas stream (e.g. air, ozone or oxygen).

The following non-limiting examples illustrate the invention

EXAMPLE 1

Synthesis and Melting Points of 1,1,3,3-Tetramethylguanidinium Carboxylates

General procedure: Propionic acid (11.9 ml, 1 eq.) was added dropwise (over 1 min) to TMG (20.0 ml, 1 eq.) in an open flask. The energy released during the addition rendered the product liquid upon stirring to give a clear liquid. This was allowed to cool under argon atmosphere to give a white crystalline solid (m.p. 62° C., 100% yield). The yields and cellulose dissolving abilities of the molten salts are presented in Table 2.

TABLE 2

| Ionic Liquid | Anion | Melting Point/° C. | Cellulose Solvation |
|---|---|---|---|
| [TMGH][CO$_2$H] | formate | 77-83 | ++ |
| [TMGH][OAc] | acetate | 90-97 | +++ |
| [TMGH][CO$_2$Et] | propionate | 62 | +++ |
| [TMGH][CO$_2$nPr] | butyrate | 67 | + |
| [TMGH][CO$_2$nBu] | valerate | 60 | − |
| [TMGH][CO$_2$nAm] | hexanoate | 43 | − |
| [TMGH][CO$_2$CF$_3$] | trifluoroacetate | 40 | − |

EXAMPLE 2

Short-Path Distillation of [TMGH][CO$_2$Et]

TMG (2 ml, 1 eq.) followed by propionic acid (1.19 ml, 1 eq.) were added into the terminal bulb of Büchi Kugelrohr (short-path distillation apparatus). The mixture was stirred until a clear homogeneous liquid was formed. The pressure inside the apparatus was reduced using a vacuum pump and the temperature raised slowly from 100° C. to 200° C. over the period of 1 hr, with only the terminal bulb inserted into the oven. The 2nd bulb was cooled with ice water to collect the distillate. After the distillation was complete, a white crystalline solid (3.00 g, 99% yield) had deposited in the 2nd bulb with a residue (20 mg) left in the terminal bulb. $^1$H & $^{13}$C NMR analysis identified the white precipitate as [TMGH][Proprionate] at >99% purity.

EXAMPLE 3

Solvation of Cellulose at 5% w/w Consistency in [TMGH][CO$_2$Et]

Commercial microcrystalline cellulose (MCC, 1.0 g) was added into TMG (12.60 ml). Propionic acid (7.50 ml) was then added over a period of 1 min with stirring until a liquid with MCC dispersed throughout was formed. The mixture was heated at 90° C. until a clear liquid was formed.

EXAMPLE 4

Partial Depolymerization of Cellulose at 10% w/w Consistency in [TMGH][OAc] at 105° C., in Comparison to [emim][OAc]

Commercial microcrystalline cellulose (MCC, 1.0 g) was added into TMG (12.60 ml). Acetic acid (5.75 ml) was then added over a period of 1 min with stirring until a liquid with MCC dispersed throughout was formed. The mixture was heated at 105° C. for 18 hr. The sample was regenerated from water and the molecular weight distribution was determined according to a literature method (J. Agric. Food Chem. 2011, 59, 829-838) against the untreated MCC (DP=381) and a sample, which had been pre-dissolved in 1-ethyl-3-methylimidazolium acetate ([emim][OAc], Iolitec, 95%) and treated under the same conditions. The molecular weight of the treated samples were determined to decrease by a small degree giving DP values of 307 and 292 for the samples regenerated from [TMGH][OAc] and [emim][OAc] respectively. Dissolution and treatment of cellulose at modest temperatures (~100° C.) allows for preservation of the molecular weight of the biopolymer, in comparison to rival ionic liquids such as [emim][OAc].

EXAMPLE 5

Depolymerization of Cellulose at 10% w/w Consistancy in [TMGH][CO$_2$Et] at 160° C.

Commercial microcrystalline cellulose (MCC, 1.0 g) was added into TMG (12.60 ml). Propionic acid (7.50 ml) was then added over a period of 1 min with stirring until a liquid with MCC dispersed throughout was formed. The mixture was heated at 160° C. for 4 hr. The sample was regenerated by addition to water, centrifuging and drying to yield a white powder (0.10 g, 10% yield). The dried powder was soluble in d6-DMSO and was found to be partially propionylated on the cellulose hydroxyl groups (FIG. 3). The low yield indicates a massive degradation of the cellulose to oligosaccharides and lower molecular weights. Hence, dissolution and treatment of cellulose at elevated temperatures >130° C. allows for depolymerization, for example, to aid in the production of biofuels. Whereas lower temperatures <130° C. generally preserves the molecular weight, in the absence of any additional catalytic species.

EXAMPLE 6

Extraction of Norway Spruce Wood with [TMGH][CO$_2$Et] at Different Temperatures Norway spruce sawdust (MCC, 0.75 g) was added into TMG (12.60 ml). Propionic acid (7.50 ml) was then added over a period of 1 min with stirring until a liquid with sawdust dispersed throughout was formed. The mixture was heated at various temperatures for 48 hr in a pressurized reactor. The samples were regenerated from water and centrifuged to yield powders of varying yield, colour and lignin contents (Table 3). The decreasing yields at temperatures >130° C. are indicative of massive depolymerization of the polysaccharide component in the wood samples.

TABLE 3

| Treatment (° C.) | Yield (%) | Color |
|---|---|---|
| 80 | 100 | light brown |
| 100 | 103 | light brown |
| 120 | 104 | brown |
| 140 | 82 | brown |
| 160 | 55 | dark brown |
| 180 | 67 | dark brown |

EXAMPLE 6

Calculation of Proton Affinities ($\Delta H_{PA}$)

$\Delta H_{PA}$ values were calculated using second order Møller-Plesset perturbation theory (MP2) with a 6-311+G(d,p) basis set from the MP2/6-311+G(d,p) optimized structures. This involved calculation of the MP2 electronic energies ($E_{ele}$) and the zero-point energies (ZPE) for each species (protonated and unprotonated). The equations used to calculate $\Delta H_{PA}$ for the reactions:

$$X^- + H^+ \rightarrow [XH] \text{ or } X: + H^+ \rightarrow [XH]^+$$

are as follows:

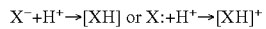

$$\Delta H_{PA} = E_X - E_{XH} + 5/2RT$$

$E_{tot} = E_{ele} + E_{rot} + E_{trans} + ZPE$ ($E_{tot}$ valid for both $E_{XH}$ and $E_X$)

$E_{rot}$=RT (rotational energy for linear species)

$E_{rot}$=3/2RT (rotational energy for non-linear polyatomic species)

$E_{trans}$=3/2RT (translational energy for all species)

R=0.0019872 kcal mol$^{-1}$ K$^{-1}$

T=298.15 K $E_{ele}$ & ZPE are obtained from the computational output. The ab initio calculations were performed using GAMESS (January 2009). A typical input file (TMG) is as follows:

```
$CONTRL SCFTYP=RHF MPLEVL=2 RUNTYP=OPTIMIZE
QMTTOL=0.0000001 ICUT=11 ICHARG=0 MULT=1
COORD=UNIQUE $END
$SYSTEM MEMORY=400000000 $END
$SYSTEM MEMDDI=60 $END
$BASIS GBASIS=N311 NGAUSS=6 NDFUNC=1 NPFUNC=1
DIFFSP=.TRUE. $END
$STATPT NSTEP=500 OPTTOL=0.00001 HSSEND=.T. $END
$FORCE PURIFY=.T. NVIB=2 $END
$ZMAT DLC=.T. AUTO=.T. $END
$SCF DIRSCF=.T. DIIS=.T. FDIFF=.F. $END
$DATA
TMG MP2 6-311+G(d,p)
C1
C 6 0.00000000 0.00000000 0.00000000
N 7 0.03300000 -1.43100000 0.29500000
C 6 -0.45900000 -1.88600000 1.50100000
N 7 -1.64500000 -1.31700000 1.90600000
C 6 -2.82400000 -1.54300000 1.06700000
H 1 -3.60500000 -0.81100000 1.29700000
H 1 -3.22600000 -2.54700000 1.24300000
H 1 -2.59500000 -1.45000000 0.00100000
C 6 -1.96000000 -1.19200000 3.32500000
H 1 -1.07800000 -0.87500000 3.89200000
H 1 -2.32000000 -2.14300000 3.73300000
H 1 -2.73500000 -0.43400000 3.48100000
N 7 0.15800000 -2.79900000 2.17800000
H 1 -0.38600000 -3.01800000 3.00900000
C 6 1.20400000 -2.11100000 -0.26100000
H 1 1.06200000 -3.19700000 -0.26400000
H 1 2.10400000 -1.86900000 0.31600000
H 1 1.37000000 -1.81100000 -1.30100000
H 1 0.27100000 0.18900000 -1.04500000
H 1 0.70700000 0.53700000 0.64100000
H 1 -0.99600000 0.43100000 0.14600000
$END
```

The invention claimed is:

1. A method of processing lignocellulosic materials, comprising in combination the steps of:
   contacting lignocellulosic material with an ionic liquid comprising a conjugate acid derived from a strong organic amidine or guanidine base and a weaker acid, under conditions which at least partially dissolve cellulosic components of the lignocellulosic material,
   recovering at least a part of dissolved lignocellulosic material by at least partial dissociation of the conjugate acid,
   recovering at least a portion of the dissociated organic base and the acid by distillation,
   forming a conjugate acid of the recovered base and acid, such that at least 90% by weight of the ionic liquid is recovered,
   contacting the conjugate acid thus formed with lignocellulosic material in a method of processing lignocellulosic material.

2. The method according to claim 1, wherein the conjugate acid is an ionic liquid which contains anions and cations as solvent, the cation being derived from a substituted amidine base having Formula I or a guanidine base having Formula II

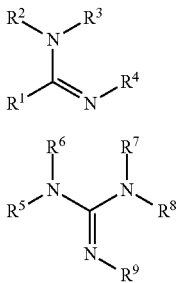

wherein, in Formula I,
R$^1$, R$^2$, R$^3$ and R$^4$ are the same or different and are selected from hydrogen, unsubstituted or substituted lower alkyl groups, aliphatic groups, heterocyclic groups and aromatic groups having 5 to 18 ring atoms, at least one of R', R$^2$, R$^3$ and R$^4$ representing an alkyl group having 1 to 6 carbon atoms, which is unsubstituted or optionally substituted; and wherein, in Formula II,
R$^5$, R$^6$, R$^7$, R$^8$ and R$^9$ are the same or different and are selected from hydrogen, unsubstituted or substituted lower alkyl groups, aliphatic groups, heterocyclic groups and aromatic groups having 5 to 18 ring atoms, at least one of R$^5$, R$^6$, R$^7$, R$^8$ and R$^9$ representing an alkyl group having 1 to 6 carbon atoms, which is unsubstituted or optionally substituted, and the anion being derived from an acid having the general formula

HX                                    III wherein X stands for an anion selected from the group of halogen, sulphate, nitrate, nitrite, phosphate, phosphinate, carboxylate, sulphonate, organosulphates, organosulfonates, organophosphates, organophosphonates or combinations thereof.

3. The method according to claim 1, wherein the unconjugated organic base has a DH$_{PA}$ value lesser than −240 kcal/mol but greater than −260 kcal/mol.

4. The method according to claim 1, wherein the anion of the unconjugated acid has a DH$_{PA}$ lesser than −300 kcal/mol.

5. The method according to claim 1, wherein the guanidine base is a derivative of a tetraalkyl derivative of guanidine, wherein the alkyl groups are methyl, ethyl or n- or i-propyl, and the anion is derived from hydrochloric acid, from a carboxylic acid having 1 to 6 carbon atoms, or from dimethylhydrogenphosphate, methyldihydrogenphosphonate, phosphinic acid or combinations thereof.

6. The method according to claim 1, wherein the difference in basicity in gas-phase proton affinity ($\Delta\Delta H_{PA}$) between the anion of the unconjugated acid (DH$_{PA\ (anion)}$) and the unconjugated base (DH$_{PA(base)}$) is ca. 95 kcal/mol, plus or minus ca. 65 kcal/mol, wherein:

DDH$_{PA}$=DH$_{PA(base)}$−DH$_{PA(anion)}$.

7. The method according to claim 1, wherein dissolved lignocellulosic material is recovered by thermolytically or chemically dissociating the ionic liquid to precipitate the dissolved lignocellulosic material.

8. The method according to claim 7, wherein the ionic liquid is heated to a temperature of 50 to 300° C.

9. The method according to claim 1, wherein at least 95% by weight of the ionic liquid is recovered by recovering the dissociated components thereof.

10. The method according to claim 1, wherein the ionic liquid comprises at least 1% by weight of a recycled conjugate acid obtained by recovery of ionic liquid from a previous step of treating a lignocellulosic material.

11. The method according to claim 1, wherein the lignocellulosic material is a member of the group comprising wood, annual plants, perennial plants, materials derived from agricultural waste and recycled lignocellulosics obtained by mechanical or chemical processing.

12. The method according to claim 11, wherein the lignocellulosic material comprises decomposed or degraded wood or wood pulp produced by mechanical, chemimechanical or chemical processing.

13. The method according to claim 1, wherein the ionic liquid is recovered by distillation without physical separation of unconjugated acids and bases.

* * * * *